United States Patent
Castiglioni et al.

(10) Patent No.: US 8,350,460 B2
(45) Date of Patent: Jan. 8, 2013

(54) FLUORESCENT COATING FOR HIGH OUTPUT LAMPS WITH COLOR TEMPERATURES OF LESS THAN 2700 KELVIN

(75) Inventors: Claudia Castiglioni, Aindling (DE); Wolfgang Gruber, Augsburg (DE); Armin Konrad, Groβaitingen (DE)

(73) Assignee: OSRAM AG, Munich (DE)

( * ) Notice: Subject to any disclaimer, the term of this patent is extended or adjusted under 35 U.S.C. 154(b) by 299 days.

(21) Appl. No.: 12/312,007

(22) PCT Filed: Oct. 22, 2007

(86) PCT No.: PCT/EP2007/061266
§ 371 (c)(1),
(2), (4) Date: Apr. 22, 2009

(87) PCT Pub. No.: WO2008/055770
PCT Pub. Date: May 15, 2008

(65) Prior Publication Data
US 2010/0052507 A1 Mar. 4, 2010

(30) Foreign Application Priority Data
Nov. 6, 2006 (DE) .................. 10 2006 052 221

(51) Int. Cl.
*H01J 63/04* (2006.01)
*C09K 11/78* (2006.01)

(52) U.S. Cl. ... 313/487; 313/485; 313/486; 252/301.4 R
(58) Field of Classification Search .......... 313/485–487; 252/301.4 R
See application file for complete search history.

(56) References Cited

U.S. PATENT DOCUMENTS

| 2001/0001207 A1* | 5/2001 | Shimizu et al. ................ 257/98 |
| 2004/0169456 A1* | 9/2004 | Scholl et al. .................. 313/485 |
| 2008/0136311 A1* | 6/2008 | Setlur et al. ................... 313/486 |

FOREIGN PATENT DOCUMENTS

| EP | 0 896 361 A1 | 2/1998 |
| JP | 52115584 A | 9/1977 |
| JP | 64-071053 A | 3/1989 |
| JP | 01309875 A | 12/1989 |
| JP | 2005120251 A | 5/2005 |
| WO | WO 02/10374 A2 | 2/2002 |
| WO | WO 02/103748 A1 | 12/2002 |

* cited by examiner

*Primary Examiner* — Nimeshkumar Patel
*Assistant Examiner* — Jacob R Stern
(74) *Attorney, Agent, or Firm* — Holtz, Holtz, Goodman & Chick, PC

(57) ABSTRACT

The invention relates to a fluorescent coating for Hg low-pressure discharge lamps, comprising a fluorescent composition from at least one green fluorescent material emitting in the green spectral range, especially a Tb-and/or Eu-doped green fluorescent material, and a red fluorescent material emitting in the red spectral range, especially a Eu and/or Mn red fluorescent material. The invention is characterized in that a further fluorescent material is present which is adapted to absorb UV Hg and Hg-Vis radiation.

7 Claims, 1 Drawing Sheet

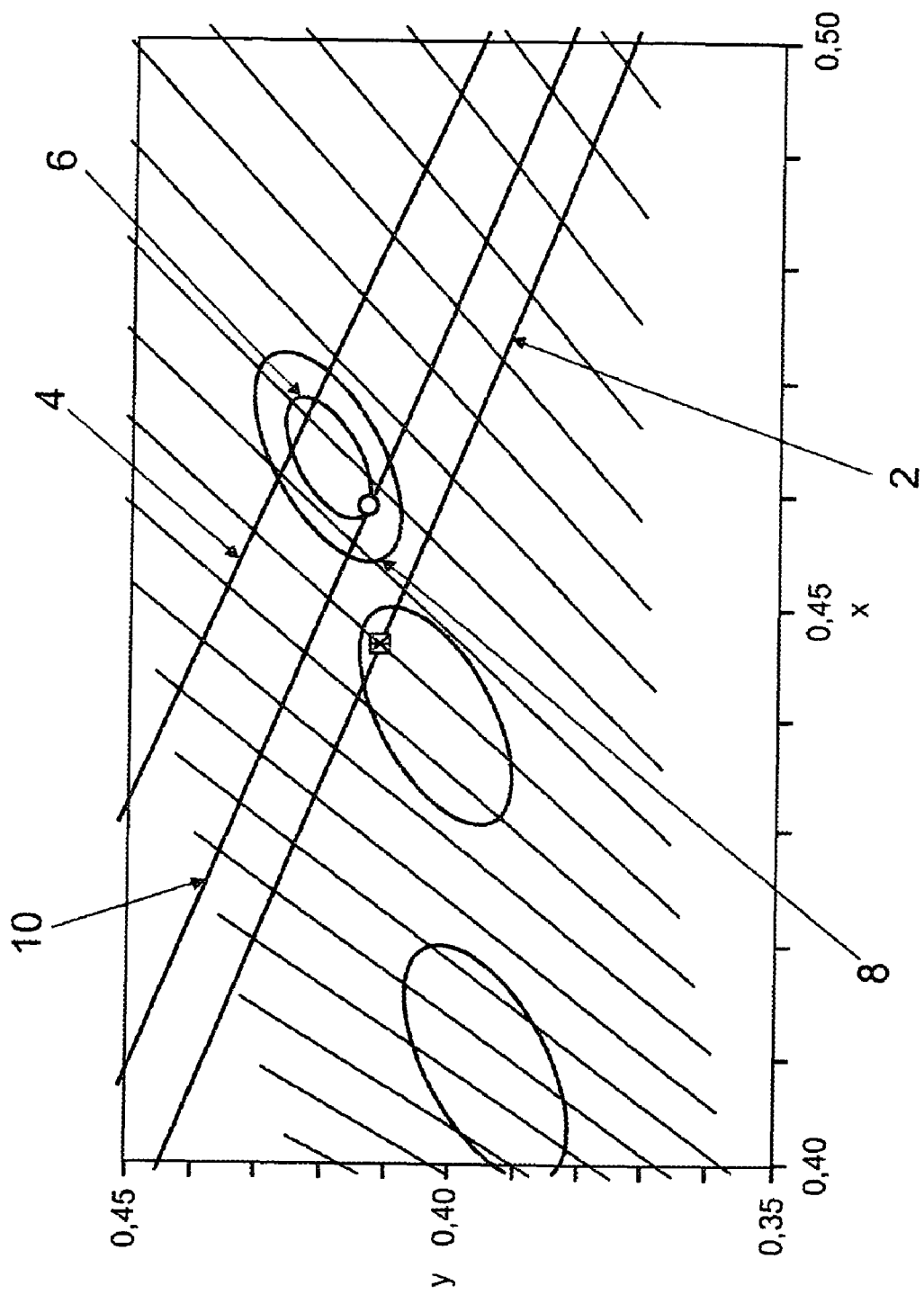

FLUORESCENT COATING FOR HIGH OUTPUT LAMPS WITH COLOR TEMPERATURES OF LESS THAN 2700 KELVIN

This application is a U.S. National Phase Application under 35 USC 371 of International Application PCT/EP2007/061266, filed Oct. 22, 2007, which is incorporated herein in its entirety by this reference.

A phosphor coating for lamps with high loading and with color temperatures of less than 2700 kelvins.

TECHNICAL FIELD

The present invention relates to a phosphor coating for an Hg low-pressure discharge lamp (the abbreviation Hg stands for mercury or mercury vapor) with a phosphor composition which comprises at least a green phosphor emitting in the green spectral region and a red phosphor emitting in the red spectral region.

PRIOR ART

A red, blue and green phosphor for radiation conversion is generally used for coating Hg low-pressure discharge lamps in order to realize color temperatures >2500 kelvins in the region of Judd's isotherms. The conventionally used phosphors (barium magnesium aluminate doped with europium $BaMgAl_{10}O_{17}$:Eu, referred to below as BAM, cerium magnesium aluminate doped with terbium $CeMgAl_{11}O_{19}$:Tb, referred to below as CAT, yttrium oxide doped with europium $Y_2O_3$:Eu, referred to below as YOE or L581) convert the radiations generated by the Hg low-pressure discharge at 185 nm and 254 nm into visible light.

The radiation component emitted by the Hg discharge in the visible region, for example at 435 nm, is not absorbed, or is only slightly absorbed, by the blue phosphor BAM, however. Accordingly, an additional bluish Hg Vis spectrum is superimposed on the phosphor spectrum provided by the phosphors BAM, CAT and YOE.

Owing to the superimposition with the Hg Vis spectrum, the chromaticity diagram covered by the phosphors excited in the UV region is reduced in size and the corner points are shifted in the direction of the Hg Vis spectrum. As a result, it is no longer possible for all of the color loci of the chromaticity diagrams conventionally covered by the phosphors to be reached. The degree of the shift in this case depends on the relative content of Hg Vis radiation in relation to the phosphor radiation, with the Hg Vis radiation content increasing with increasing charging current and increasing current density in the discharge vessel.

Lamps with high loading therefore have a high Hg Vis radiation content, for which reason color temperatures of 2700 kelvins can no longer be achieved merely by mixing a green and/or red phosphor. In other words, the color locus tolerance field is outside the achievable chromaticity diagram. In addition, the progressive miniaturization of the discharge vessels, on the one hand, and the increasing radiation power for high-output lamps, on the other hand, make it difficult to realize Hg low-pressure discharge lamps compliant with standards with low color temperatures.

In order nevertheless to be able to achieve color temperatures <2700 kelvins, it has been proposed in the prior art to use filter films to reduce or avoid the bluish Hg Vis component, with these films being turned over the discharge vessel.

These filter films have the disadvantages, however, that they are firstly expensive and secondly do not have ageing stability or else can only be used with a disproportionally high degree of complexity for compact fluorescent lamps owing to the geometry of the discharge vessel, for example.

Furthermore, the prior art has proposed providing a pigment coating absorbing the bluish radiation, for example a coating with $Fe_2O_3$ powder, between the discharge vessel and the phosphor layer. Owing to the additional coating, however, the luminous efficiency of the lamp is reduced, for which reason a disproportionally greater amount of power needs to be made available for sufficient brightness. This means that a high quantity of energy is involved, which in turn is contrary to conventional power-saving measures.

DESCRIPTION OF THE INVENTION

The object of the present invention is therefore to provide a possibility for achieving low color temperatures even in the case of lamps with high loading.

This object is achieved by virtue of the fact that a phosphor is added to the phosphor coating for Hg low-pressure discharge lamps comprising at least a green phosphor emitting in the green spectral region and a red phosphor emitting in the red spectral region, with this additional phosphor being designed to absorb UV Hg and Hg Vis radiation. In this case, this phosphor is advantageously a yellow phosphor emitting in the yellow spectral region.

Advantageously, this yellow phosphor not only absorbs the ultraviolet Hg radiation, but also to a high degree the bluish Hg Vis radiation and converts both Hg radiation components into visible radiation, with its dominant wavelength being >520 nm.

Particularly advantageous is an exemplary embodiment in which the yellow-emitting phosphor $Y_3Al_5O_{12}$:Ce is used as the additionally used phosphor.

In this case, it is particularly advantageous if this yellow phosphor is designed in such a way that a color locus of x=0.463 and y=0.420 on a chromaticity diagram in the CIE 1931 XYZ color space can be set.

This can be achieved, for example, as is shown by a further preferred exemplary embodiment, by virtue of the fact that the yellow phosphor is set to have a concentration of up to 20 percent by weight, in particular up to 10 percent by weight, with respect to the green phosphor.

It is particularly advantageous if CAT ($CeMgAl_{11}O_{19}$:Tb), lanthanum phosphate doped with cerium and terbium (referred to as LAP) or cerium gadolinium magnesium pentaborate doped with terbium (referred to as $(Ce,Gd,Tb)MgB_5O_{10}$ or CBT) is used as the green phosphor and/or yttrium oxide doped with europium (referred to as $Y_2O_3$ or YOE) or germanium zinc magnesium pentaborate doped with cerium and manganese (referred to as $GeZnMgB_5O_{10}$:Ce, Mn or L165) is used as the red phosphor.

Further advantages and preferred exemplary embodiments will be defined in the dependent claims, the drawings and the associated description.

BRIEF DESCRIPTION OF THE DRAWING

The invention will be explained in more detail below with reference to an exemplary embodiment. The exemplary embodiment illustrated in the FIGURE is purely exemplary in nature and is not intended to be used for restricting the invention to this exemplary embodiment.

In the FIGURE:

FIG. 1 shows a graphical illustration of the color loci, which can be set, with a phosphor coating known from the prior art comprising a green phosphor and a red phosphor, which color loci are used in a lamp with high loading or a lamp with low loading, and with a particularly preferred exemplary embodiment of the phosphor mixture according to the invention.

PREFERRED EMBODIMENT OF THE INVENTION

All of the color loci which can be set with a coating comprising a phosphor mixture known from the prior art comprising $Y_2O_3$:Eu as the red phosphor and CAT:Ce, Tb as the green phosphor, come to lie on the isotherm denoted by 2 in the FIGURE. In this case, the lamp is a normal Hg low-pressure discharge lamp, and therefore one which tends to have a high loading.

On the other hand, the isotherm 4 represents the possible color loci of a phosphor coating comprising a phosphor mixture known from the prior art with $Y_2O_3$:Eu as the red phosphor and CAT:Ce, Tb as the green phosphor. In this case, however, an Hg low-pressure discharge lamp with a low loading, in particular a tubular fluorescent lamp with a rated power of 36 W, is used.

The ellipses denoted by 6 and 8 represent the color locus tolerance fields with 3 and 5 threshold value units (3 SWE and 5 SWE), respectively, for the light color 2700 kelvins. In this case it can be seen that although the color temperature of 2700 kelvins is achieved with the coating known from the prior art in the case of Hg low-pressure discharge lamps with low loading, the coating for Hg low-pressure discharge lamps with normal loading (cf. isotherm 2) cannot be achieved.

The color loci which can be set with the phosphor coating according to the invention comprising $Y_2O_3$:Eu as the red phosphor, CBT:Ce, Tb as the green phosphor and YAG:Ce as the yellow phosphor come to lie on the isotherm 10. In this case, it can be seen that it is easily possible to set the color locus for the light color 2700 kelvins with the phosphor mixture according to the invention.

The invention discloses a phosphor coating for Hg low-pressure discharge lamps with a phosphor composition comprising at least a green phosphor emitting in the green spectral region, in particular a Tb-and/or Eu-doped green phosphor, and a red phosphor emitting in the red spectral region, in particular an Eu-and/or Mn-doped red phosphor, a further phosphor being provided, which is designed to absorb UV Hg and Hg Vis radiation.

The invention claimed is:

1. A phosphor coating for Hg low-pressure discharge lamps with a phosphor composition consisting of:
    a green phosphor emitting in the green spectral region;
    a red phosphor emitting in the red spectral region; and
    a further phosphor emitting in the yellow spectral region,
    wherein the further phosphor absorbs UV Hg and Hg Vis radiation and has an emission maximum at a wavelength greater than 520 nm;
    wherein cerium magnesium aluminate doped with terbium ($CeMgAl_{11}O_{19}$:Tb or CAT), lanthanum phosphate doped with cerium and terbium ($LaPO_4$:Ce, Tb or LAP) or cerium gadolinium magnesium pentaborate doped with terbium ($(Ce, Gd, Tb)MgB_5O_{10}$ or CBT) is used as the green phosphor; and
    wherein yttrium oxide doped with europium ($Y_2O_3$:Eu or YOE or L581) or germanium zinc magnesium pentaborate ($GeZnMgB_5O_{10}$:Ce, Mn or L165) is used as the red phosphor.

2. The phosphor coating as claimed in claim 1, the further phosphor being $Y_3Al_5O_{12}$:Ce.

3. The phosphor coating as claimed in claim 1, wherein a concentration of the further phosphor is capable of being set such that a color locus of x =0.463 and y =0.420 on a chromaticity diagram in the CIE 1931 XYZ color space can be set.

4. The phosphor coating as claimed in claim 1, the further phosphor being contained in a concentration of up to 20 percent by weight based on the green phosphor content in the phosphor composition.

5. An Hg low-pressure discharge lamp with the phosphor coating as claimed in claim 1, and a discharge current of greater than or equal to 200 mA.

6. The Hg low-pressure discharge lamp as claimed in claim 5 in the form of a compact fluorescent lamp.

7. The phosphor coating as claimed in claim 4, the further phosphor being contained in a concentration of up to 10 percent by weight based on the green phosphor content in the phosphor composition.

* * * * *